(12) United States Patent
Longin et al.

(10) Patent No.: US 11,587,015 B2
(45) Date of Patent: Feb. 21, 2023

(54) SYSTEM AND METHOD FOR DELIVERING ARTICLES FROM A START POINT TO A DESTINATION POINT BY MEANS OF DRONES

(71) Applicant: Ford Global Technologies, LLC, Dearborn, MI (US)

(72) Inventors: David Longin, Herent (BE); Mark Gijbels, Binkom (BE)

(73) Assignee: Ford Global Technologies, LLC, Dearborn, MI (US)

( * ) Notice: Subject to any disclaimer, the term of this patent is extended or adjusted under 35 U.S.C. 154(b) by 974 days.

(21) Appl. No.: 16/351,725

(22) Filed: Mar. 13, 2019

(65) Prior Publication Data

US 2019/0295033 A1 Sep. 26, 2019

(30) Foreign Application Priority Data

Mar. 20, 2018 (DE) .......................... 102018204205.5

(51) Int. Cl.
*G06Q 10/08* (2012.01)
*B64C 39/02* (2006.01)
(Continued)

(52) U.S. Cl.
CPC ....... *G06Q 10/0833* (2013.01); *B64C 39/024* (2013.01); *G01C 21/343* (2013.01);
(Continued)

(58) Field of Classification Search
CPC .. G06Q 10/0833; G06Q 50/28; G06Q 10/083; G06Q 10/06; G06Q 10/0832;
(Continued)

(56) References Cited

U.S. PATENT DOCUMENTS 9,659,502 B1 * 5/2017 Abebe ....................... G08G 1/20
9,811,796 B2 11/2017 Ogilvie et al.
(Continued)

FOREIGN PATENT DOCUMENTS

DE 102016006555 A1 2/2017
EP 3246776 A1 11/2017
(Continued)

OTHER PUBLICATIONS

Nils Boysen, Scheduling last-mile deliveries with truck-based autonomous robots, European Journal of Operational Research, vol. 271, Issue 3, 2018, <https://www.sciencedirect.com/science/article/pii/S0377221718304776 (Year: 2018).*
(Continued)

*Primary Examiner* — Shannon S Campbell
*Assistant Examiner* — Manal A. Alsamiri
(74) *Attorney, Agent, or Firm* — Brandon Hicks; Eversheds Sutherland (US) LLP

(57) ABSTRACT

A system for delivering articles (34) from a start point (54) to a destination point (56), having at least one drone (20), which a) has a flight control unit (22) configured for autonomous flying, b) has at least one flight motor realized as an electric motor (24), c) has a battery (28) that supplies the flight motor with voltage, d) has a programmable control (30) unit, and e) on its underside has a coupling (34) for electrical, and preferably also mechanical, connection, having a control center (50), which is wirelessly connected to the control unit (30) of the drone (20), having a mobility network consisting of a fleet of vehicles (44), in particular road vehicles, each vehicle having a drone carrier (40), which has a mating coupling (38) that acts in combination with the coupling (36), and having a digital mobility platform (46), which is wirelessly connected to the fleet of vehicles (44) and which is informed about their travel
(Continued)

Figure 1:
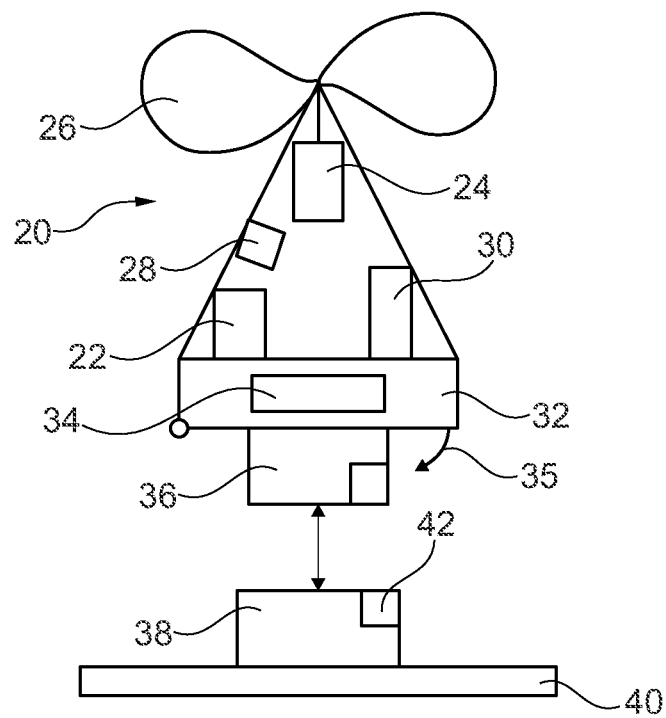

schedules, drone carriers (40) and current locations of the vehicles (44), and is connected to the control center (50).

9 Claims, 2 Drawing Sheets

(51) Int. Cl.
| | | |
|---|---|---|
| *G05D 1/00* | (2006.01) | |
| *G08G 5/00* | (2006.01) | |
| *G05D 1/10* | (2006.01) | |
| *G01C 21/34* | (2006.01) | |
| *G06Q 10/0833* | (2023.01) | |
| *G06Q 10/0832* | (2023.01) | |

(52) U.S. Cl.
CPC ....... *G01C 21/3415* (2013.01); *G05D 1/0027* (2013.01); *G05D 1/104* (2013.01); *G06Q 10/0832* (2013.01); *G08G 5/0008* (2013.01); *G08G 5/0034* (2013.01); *B64C 2201/122* (2013.01); *B64C 2201/128* (2013.01)

(58) Field of Classification Search
CPC .......... B64C 2201/146; B64C 2201/12; B64C 2201/122; B64C 39/024; B60P 3/11; G08G 7/00; G08G 5/0034; G08G 5/0008; G05D 1/104; G05D 1/0027; G01C 21/343; G01C 21/3415
See application file for complete search history.

(56) References Cited

U.S. PATENT DOCUMENTS

| | | | |
|---|---|---|---|
| 10,789,567 B1 * | 9/2020 | Ur | G06Q 10/083 |
| 2014/0032034 A1 | 1/2014 | Raptopoulos et al. | |
| 2015/0102154 A1 * | 4/2015 | Duncan | B64C 39/024 701/300 |
| 2015/0370251 A1 * | 12/2015 | Siegel | B64C 39/024 701/2 |
| 2016/0257401 A1 * | 9/2016 | Buchmueller | G01C 21/343 |
| 2016/0328979 A1 * | 11/2016 | Postrel | H04W 4/40 |
| 2017/0011340 A1 | 1/2017 | Gabbai | |
| 2017/0160735 A1 * | 6/2017 | Mikan | G08G 1/205 |

FOREIGN PATENT DOCUMENTS

| | | | | |
|---|---|---|---|---|
| KR | 2016136594 A | * | 11/2016 | ............ B60F 5/02 |
| WO | 2017/079587 A1 | | 5/2017 | |
| WO | 2017/083282 A1 | | 5/2017 | |

OTHER PUBLICATIONS

Search Report issued in German Application No. 102018204205.5, dated Feb. 26, 2019 (10 pages).

Digital vernetzte Lieferkette: MercedesBenz Vans konzipiert Transporter fur hocheffizientes Logistikkonzept auf der letzten Meile (Digital Connected supply chain: Mercedes-Benz Vans designs transporters for a highly efficient logistics concept on the last mile); Sep. 2016 (26 pages).

* cited by examiner

SYSTEM AND METHOD FOR DELIVERING ARTICLES FROM A START POINT TO A DESTINATION POINT BY MEANS OF DRONES

CROSS-REFERENCE TO RELATED APPLICATIONS

This application claims priority to and the benefit of German patent application No. 102018204205.5, filed Mar. 20, 2018, which is hereby incorporated by reference herein in its entirety.

The invention relates to a system and a method for delivering articles, or packages, from a start point to a destination point. Drones are used, which each carry one article. A drone has only a limited flight duration and a limited accommodation capability for an article, both limitations also being inter-related. The heavier the articles, the shorter is the flight duration. The invention uses smaller drones, which can transport articles up to a maximum of 10 kg in weight, in particular up to a maximum of 3 kg in weight. Drones are to be used that are available on the market and that, furthermore, are subject to as few official regulations as possible. They are to operate only in a limited area. It is sought in this case not to use different drones in order to bring an article from the start point to the destination point, but for the transport to be effected, insofar as possible, by a single drone.

The limited area in this case is of greater dimensions than the normal flight distance of the drones. In other words, the individual drone cannot cover the distance from the start point to the destination point in a single flight section. Preferably, the limited area is the area of a city. Normally, in an urban environment, the demand for the transport of articles is relatively high. Starting from a warehouse, which usually forms the start point and in which the individual articles are located, in each case a single article is to be delivered to a particular destination point by means of a drone, in which case each article, and therefore each drone, usually has a single destination point. Following delivery of the article, the drone is to return to its start point or fulfill a new assignment. At its start point, it can receive a further article and execute a further flight.

It is also possible, however, for the individual drones to receive articles from different start points, thus for example different customers, and to bring them to a common destination point, in which case the destination point may be a warehouse, for example the warehouse of a mailroom, transport company or the like.

The delivering of articles by means of drones is known. Thus, known from US 2014/032034 A1 is a system for delivering articles that uses a plurality of autonomously navigating drones. The system has a number of base stations, which communicate with the drones and transmit location information to them. The system is controlled via a computer.

US 2017/011340 A1 describes systems and methods for delivering a package to a destination by use of a drone. Upon receipt of an assignment, a base station, in which the package is located, is first sought. The instruction to deliver the package to the destination is transmitted to the drone. It obtains a specific flight plan for the route to the destination.

WO 2015/155087 A1 describes a method for delivering a shipment by an unmanned transport device, in the form of a drone, to a destination. The destination has a receiving container for the shipment. When the drone is in the area around the destination, it exchanges information with the receiving container. This includes information concerning the authorization to deposit the shipment in the receiving container, and additionally locating signals, so that the drones can find the destination in the immediate vicinity.

It is known from WO 2017/079587 A1 to drive a road vehicle into a delivery zone. On board the road vehicle are a plurality of drones, and additionally articles that are to be delivered to end customers. When the road vehicle is in the delivery zone, drones are started, they are each loaded with one article and fly to end customers, where the article is deposited. The drones then fly back to the road vehicle.

Known from WO 2017/083282 A1 is a delivery system for products in which a product that is to be delivered is transferred by a drone to a waiting vehicle of an end customer that is located in a special area. Installed there are cameras, which record the waiting vehicle and the drone. The exact position for delivery of the product is determined by means of image processing.

An advantage of delivering articles by means of drones according to the prior art is the speed, which is also due to the direct flight path. The drones can deliver articles directly from the start point to the destination point, irrespective of blocked roads or difficult traffic conditions. In a multiplicity of cases, however, it is not a matter of a direct delivery of the article and/or a direct flight path, but instead in the majority of cases it suffices that the article gets from the start point to the destination point within a predefined time-frame, for example three hours. In other words, in such cases a time-frame is allowable, which is at least three times, in particular five times, and possibly ten times, the time span that is to be estimated for a direct flight.

A drone is understood to mean an unmanned aircraft. It is controlled from a control center. The drone is connected, via radio link, to networks such as, for example, Internet, GPS, etc., and via them to the control center, and exchanges data by means of these radio links. The drone can operate independently, in particular can navigate autonomously. A temporary interruption in the radio link to the control center is therefore non-critical. During a journey, the drone in each case communicates its current position to the control center. Preferably, there is additionally the possibility of controlling the drone remotely, without it operating independently. The drone is normally constructed in a manner similar to a helicopter, for example realized as a quadrocopter, but may also be designed as an airship. It is has a motor-driven propulsion, being driven by an electric motor.

The invention had set the object of providing a system and a method for transporting articles, or packages, within a limited area, wherein drones are used, which normally do not have a sufficient flight duration for delivery of the article between the start point and the destination point, and wherein the time for transporting the article between the start point and the destination point may be greater than the transport time achieved in the case of a direct flight between the start point and the destination point.

This object is achieved by a system for delivering articles from a start point to a destination point, having at least one drone, which a) has a flight control unit configured for autonomous flying, b) has at least one flight motor realized as an electric motor, c) has a battery that supplies the flight motor with voltage, d) has a programmable control unit, which has at least one associated memory, and e) on its underside has a coupling for electrically, and preferably also mechanically, connecting to a control center, which is wirelessly connected to the control unit, having a mobility network consisting of a fleet of vehicles, in particular road vehicles, each vehicle having a drone carrier, which has a mating coupling that acts in combination with the coupling, having a digital mobility platform, which is wirelessly connected to the fleet of vehicles and which is informed about their travel schedules, drone carriers and current locations of the vehicles, and is connected to the control center.

This solution has the advantage that an individual drone does not have to cover the full distance between the start point and the destination point by flight. It is thus possible to select a small drone that is actually designed for shorter flight distances. As great a proportion of the road distance as possible is covered by the drone in that it travels on vehicles, also referred to as shuttles in the following. The drone in this case makes use of the fact that these vehicles are travelling in the limited area in any case and, apart from initial investments for the drone carrier and ongoing costs for the data link, transporting the drones has practically no financial impact.

In respect of method, the transporting of an article from a start point to a destination point proceeds according to the following method steps:
a) inputting the data of an article, in particular its destination point, into a control center,
b) organization of the journey of the article to the destination point by the control center, comprising the individual steps
   selecting a drone for the journey,
   planning the itinerary, planning a division into flight sections and road sections, with request to the mobility platform for a drone place for at least one road section, and booking the at least one road section, including planning at least one flight section,
   storing the at least partly complete itinerary, and transmitting data of the stored itinerary into the control unit of the drone,
   start command to the drone.

Preferably, the control center continuously receives data concerning the current location of the drone. Preferably, the control center checks whether these current data of the location and time correspond with the planned itinerary. Then, if a discrepancy is ascertained, it can calculate a new itinerary. The drone then follows the new itinerary.

Preferably, the control center obtains information on whether or not the drone is located on a drone carrier. Preferably, if it is ascertained during the journey of the drone that there is currently no suitable drone carrier in the vicinity of the drone, the control center requests a waiting place and, if the latter is in the vicinity and is free, instructs the drone to park on the waiting place.

Preferably, in the organizing of the journey, the proportions of flight sections on the itinerary are weighted with a higher weighting factor than the proportions of road sections on the itinerary. Preferably, the weighting factor for the kilometer flight section is at least twice as great as for the kilometer road section. For the total distance of the journey, the sum of the individual weighting factors times length of the associated individual distance is minimized.

Advantageously, the planning is configured such that, for a journey, the total sum of the road sections is greater than the total sum of the flight sections, in particular at least twice as great. Advantageously, in the case of a transport standstill on a road section, thus if the location coordinate of the drone does not change for a certain time span, the control center will cause the drone to leave the drone carrier and to fly to another drone carrier or, if appropriate, to the destination point.

It is proposed to integrate a drone supply swarm into an urban mobility network. An urban mobility network, consisting of a fleet of vehicles, in a network on a series of routes, which are connected, via connection nodes, to a digital mobility platform, which controls the traffic flow of the fleet of vehicles and, if appropriate, establishes a connection to a higher-order network.

The delivering drone is regarded as a further class of passengers or goods, which can be transported on or inside the urban mobility network and share the same infrastructure.

The shuttles are equipped with a drone carrier (e.g. on the roof), on which the drones land automatically, can dock themselves with sufficient mechanical solidity for the entire journey, and then start again. This can also be effected while the shuttle is travelling. This does not affect the previous functioning of the shuttle. The shuttle does not have to make any special stops for the drone or wait for the drone, and does not have to travel any distances other than previously.

The drone carriers are preferably equipped with a charging station, for electrically charging the drone during transport on the shuttle. The charging makes it possible to use drones that have smaller ranges or, in other words, to use smaller, and therefore lighter, batteries for the benefit of a greater payload.

A shuttle is understood, in general, to mean any vehicle that moves in the traffic within the limited area and that is equipped with at least one drone carrier. For example, it may be a service bus, a tram, a suburban train or the like, which travel predefined routes to a fixed time schedule. A shuttle may also be a vehicle that does not travel predefined road routes, but that, e.g. as a taxi, delivery vehicle and the like, notifies the mobility platform of a planned future itinerary and thus offers a drone the possibility of co-travel. A price to be paid to the respective operator of the shuttle can be agreed for the co-travel. The accounting is effected via the mobility platform and the control center.

The place on a drone carrier can be booked in advance. This is effected, for example, in the planning of a new drone journey. In this planning, which is effected in the control center, the entire journey of the drone, including co-travel on individual shuttles, and flight sections can be planned in advance, and the drone carriers can be requested first. In the subsequent booking, a drone carrier of a specific shuttle is reserved for the drone for a certain period of time.

It is also possible, however, that the journey of a drone is not fully planned in advance by the control center, but is controlled a bit at a time, in individual stages by the control center, i.e. that the drone moves like a person in the traffic and in each case, at or before reaching an intermediate destination, searches for the most favorable possibility for the next section of the journey.

In the case of a problem, for example in the case of a traffic jam, the control center may instruct the drone to leave a shuttle earlier than first planned, or to remain longer on a shuttle, etc. The control center obtains the necessary information from the mobility platform. The control center may search for another shuttle for the drone, which is in the vicinity and which would not have been in consideration for co-travel in the case of full pre-planning of the journey.

A drone provides a point-to-point delivery for each individual article, which is preferably realized as a package, one at a time: collection, transport and delivery are performed by the same drone for one article. As soon as a delivery is completed, the drone will re-route in order to collect the next article for a next delivery, or merely fly back to a collecting station and wait there.

If, during the journey, a connecting journey on a vehicle is not yet available, it is advantageous to provided waiting points or hubs in the limited area, where the drones can park until the next journey. These waiting points, for their part, are equipped with a drone carrier.

During their journey, the drones will alternately fly themselves, or be carried, landed on a drone carrier, by vehicles/shuttles, or wait at a waiting point for the next instruction by the control center. They may hop from one drone carrier to another drone carrier of another shuttle or of a waiting point. The drones in this case may land and start without interfering with the transport of passengers or other function of the shuttle. They may land on the travelling or stationary shuttle, and start from it. The itinerary of the drone is optimized such that the flight distance is as short as possible and there is as much transport as possible on a shuttle. For this purpose, a flight section is weighted with a higher factor than a transport section on a shuttle, and an optimum is calculated in the control center. In this case, the totality of the journey of the drone is taken into account, in order that the article can be delivered to the destination point within a promised time.

Drone management is effected by the control center. The latter knows the start points and destination points of the individual drone flights, the positions of the individual drones, the condition and the characteristics of the individual drones, the possible priority of a journey, and the future, already accepted, assignments for journeys. The control center is connected to a mobility platform, which has access to the traffic flow of the fleet of shuttles and, preferably, other vehicles. If necessary, a mobility integrator platform may be provided, which is of a higher order than this mobility platform and which is connected to the mobility platform. From the mobility platform, the control center obtains the necessary information concerning the time schedules, the current location, the occupancy and reservation of the drone carriers, etc., thus in total all kinds of information concerning the shuttles. The drone swarm and the shuttle fleet operate in the same limited area. The coordination between drones and shuttles is performed by the mobility platform and/or the control center.

The control center enables drones to fly to available drone carriers of (preferably electrically operated) shuttles and to land there. It may also assign free shuttles in order to move a drone, or prioritize the routing of shuttles between drone/article and passenger transport, if this is necessary. If the full journey cannot be completed within the current available routs, the control center may also send a drone to a waiting place, i.e. to a stationary intermediate landing place, which is likewise equipped with a drone carrier. The control center will then undertake the search for a connecting journey.

Upon the receipt of an article (from a customer or from the warehouse), the journey begins for the drone in that the control center first stores the desired destination of the article, and conditions for the delivery, for example latest delivery time, priority of the assignment, particular conditions at the destination, etc. The control center then commences planning of the flight, and a drone is selected. As soon as the best route has been found for the drone, from a number of checked routes, the control center accessing the information in the mobility platform, the drone starts with a short flight in the direction of the nearest shuttle, and lands on the drone carrier there. The place on this drone carrier was reserved in advance by the control center, via the mobility platform. The drone remains on the drone carrier until there is another shuttle present in the vicinity that has a better route to the destination point. The drone carrier of this shuttle has either been reserved in advance by the control center or is booked by the latter at a present time as soon as the control center identifies that the next shuttle is more favorable for the journey of the drone. If the distance between the two shuttles is as small as possible, the drone leaves the first shuttle and makes a short flight to the second shuttle. These short flights to a further shuttle may be repeated until the drone is in the vicinity of the destination. When close to the latter, the drone leaves the drone carrier of the last shuttle and delivers the article at the destination point.

Since the shuttles and drones are connected and integrated in a common digital mobility platform, the route can be altered dynamically at any time with changing routing demands (such as traffic jams) or new possibilities (such as new passenger journeys).

By use of a swarm of hopping drones, the transport capacity is multiplied, in that the same behavior of an individual drone is reproduced. All drones preferably have the same point-to-point delivery capability, and the shuttle network provides a long range and duration. This provides an immense, automated point-to-point delivery capability over long distances, since there is no use of a central drone transport hub (such as a drone truck) that limits the capacity and frequency.

An exemplary embodiment for the system according to the invention, which is also used to explain the method, is explained in greater detail in the following and described in greater detail with reference to the drawing. This exemplary embodiment is to be understood as being non-limiting. There are shown in the drawing FIG. 1 a schematic representation of a drone, with a drone carrier located beneath it, FIG. 2 a vehicle having a drone carrier, FIG. 3 a block diagram of the system used, and FIG. 4 a schematic representation of a limited territorial area, with start point and destination point for a journey of a drone.

FIG. 1 shows a schematic representation of a standard commercial drone 20. It has a flight control unit 22, an electric motor 24, a rotor 26, which is driven by the electric motor 24, and a battery 28 for supplying electric current to the flight control unit 22, the electric motor 24 and possibly further on-board consumers. Provided in its lower region is a space 32 suitable for accommodating an article 34. In the space 32, this article 34 is accommodated in a protected manner, thus for example securely protected against rain. The space 32 has a floor, which can be folded downward, see arrow 35. When the floor is open, the article 34 can be brought into the space 32, and can be dropped and delivered at the destination point. A coupling 36 is provided below the floor. It is primarily a mechanical coupling. Preferably, it is also an electrical coupling, in which case it is electrically connected to the control unit 30. If realized as an electrical coupling, it can receive the charging voltage for the battery 28, and the battery 28 can then be charged via the control unit 30. It is possible to provide exchangeable batteries 28.

Acting in combination with the coupling 36 is a mating coupling 38. It is arranged on a drone carrier 40. A drone 20 can land on this drone carrier 40, this being effected autonomously and automatically. In this case, the coupling 36 and the mating coupling 38 come into engagement. The drone 20 is then mechanically connected to the drone carrier 40. This connection is sufficiently solid for the forces occurring during normal travel operation of a vehicle.

In the preferably in realization, the mating coupling 38 also is an electrical coupling. An electrical connection to the drone 20 is thereby possible. The electrical connection serves to charge the battery 28, but it may also be used for data transfer.

The coupling 36 and the mating 38 are each provided with a sensor 42, which emits a signal concerning whether or not the coupling is closed. In the case of the preferably electrical realization of both coupling parts 36, 38, one of the sensors 42, preferably that of the drone 20, may be omitted. Via the sensor 42 of the drone carrier 40, it can be queried at any time whether or not the associated drone carrier 40 is occupied.

Figure 2:
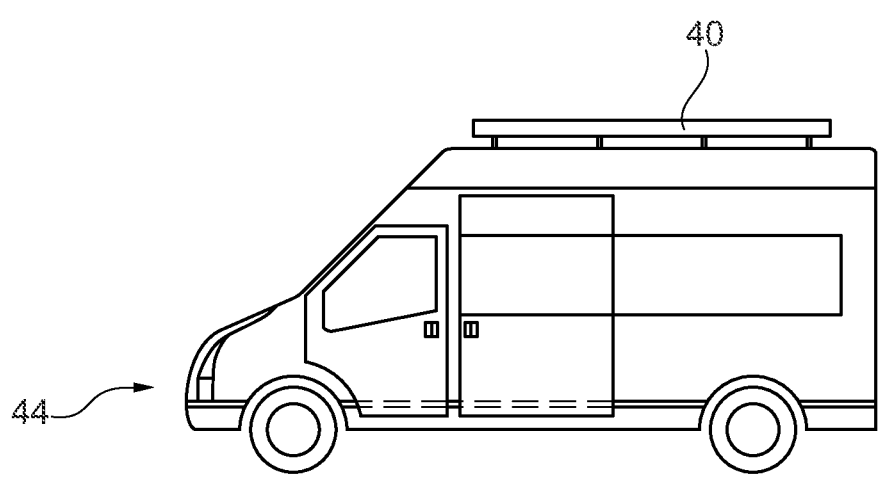

FIG. 2 shows an example of a vehicle 44 which, for example, is part of a public urban local-transport fleet. On its roof it carries a drone carrier 40. The vehicle 44, and therefore also the at least one drone carrier 40, is connected, via a radio link, to a mobility platform 46, which is explained in greater detail in the following with reference to FIG. 3.

Figure 3:
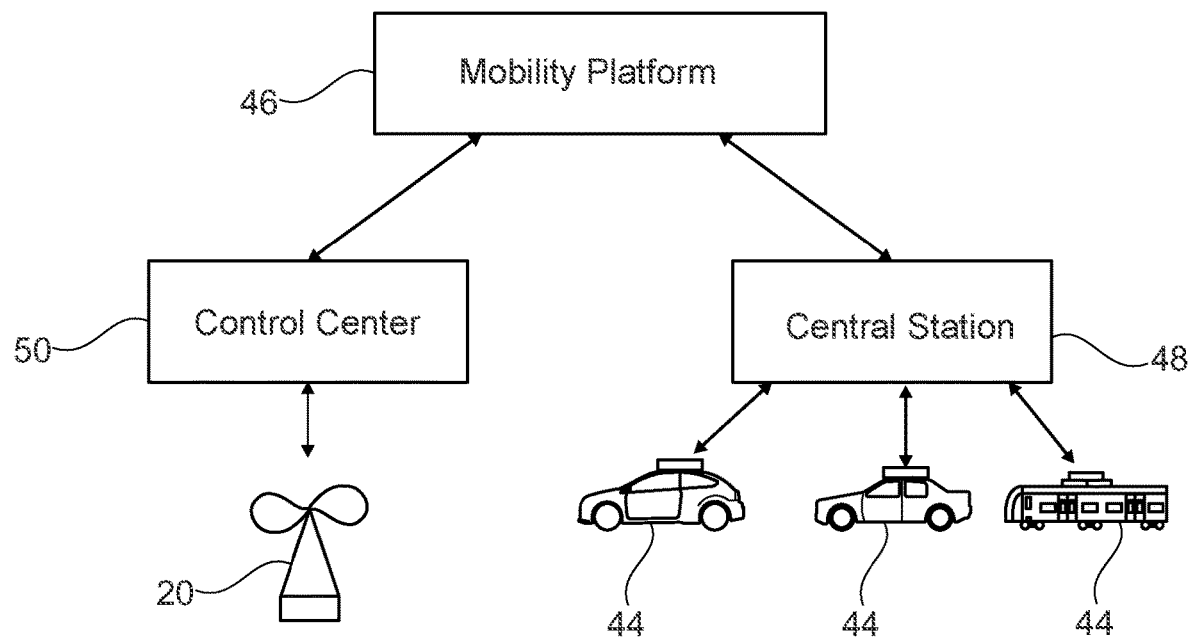

FIG. 3 shows a block diagram of the system used. Present in the mobility platform 46 are the data and the current status of at least one mobility network. Examples of a mobility network are the local public transport network, the taxis of a town, a fleet of package delivery vehicles, etc. In the exemplary embodiment shown, this mobility network has its own central station 48. The latter is responsible for acquiring the data and possibly controlling the individual vehicles 44. It has information on which of the vehicles 44 are equipped with a drone carrier 40 and which are not. Only the first are relevant to the invention. If a plurality of mobility networks are used, it is advantageous for each to have its own central station. The central stations 48 are reciprocally connected to the mobility platform 46.

The mobility platform 46 is furthermore reciprocally connected to a control center 50, which is responsible for the drones 20. The control center 50 is connected by radio link at least to the drones 20 that are executing a journey.

Figure 4:
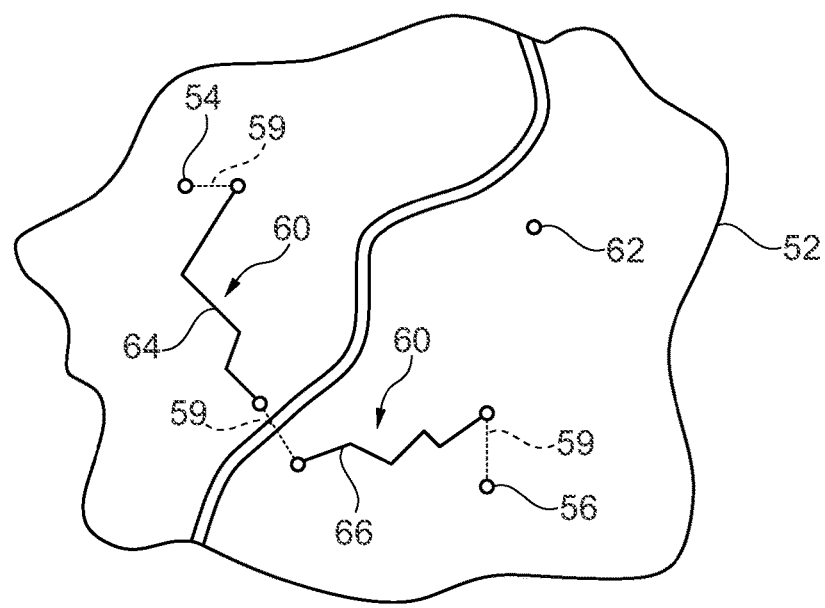

Shown schematically in FIG. 4 is a portion of a map, namely, a limited area 52 of a town. The figure shows a start point 54, from which a drone 20 begins its journey. The journey ends at a destination point 56, where the drone 20 delivers an article 34 received at the start point 54.

The start point 54 is advantageously located in the vicinity of a node point of the mobility network, if the start point 54 is a warehouse such as, for example, a dispatch warehouse. If individual articles 34, for example packages that individual senders wish to dispatch, are to be received by the system and brought to a central station such as, for example, a mail station or the like, it is advantageous to select the centrally situated station as the destination point.

In FIG. 4 the flight sections 59 are represented by straight lines, which are additionally broken lines. The co-travel sections 60 of the journey of the drone 20, i.e. the subsections of its journey that the drone 20 covers on a drone carrier 40 of a vehicle 44, are represented by irregular, unbroken lines, corresponding to the irregular road course. Also indicated in a rest point 62, but in the specific case it is not used by the drone 20.

The method for transporting an article by means of a drone 20 from the start point 54 to the destination point 56 proceeds as follows: Present at the start point 54 is an article 34, which is to be transported to a destination point 56. This transport is to be completed within a specific period of time, for example within 3 hours following receipt of the article 34. The article has a certain weight and a certain volume; only articles 34 that are within communicated limits in these respects are accepted.

The assignment associated with the specific article 34 is input to the control center 50. This is normally done by a person. The control center 50 then organizes the journey for this article 34. It searches for a drone 20 that is suitable for transporting the specific article 34, and that is available. Via the mobility platform 46, it inquires which vehicles 44 can currently be used for the road sections of the journey of the drone 20.

In the specific case, it is assumed that the control center 50 plans the journey fully in advance. For a first road section 64, the control center 50, via the mobility platform 46, requests a place on a drone carrier 40 of a vehicle 44, which here is a first service bus. This vehicle is currently in the vicinity of the start point 54. The mobility platform 46 responds positively to the request, and the place is reserved for the first road section of the vehicle 44. The control center 50 then further asks the mobility platform 46 whether there is a drone place free for a further road section that is to be travelled with a delivery vehicle of a package delivery service. In this case, the mobility platform 46 responds negatively to the request. The control center therefore searches for an alternative, and inquires about the availability of the drone carrier 40 for a second road section 66 of a second service bus. This time the answer is positive, the mobility platform 46 has made a reservation for this second road section 66 and communicated this to the control center 50. The latter then books the two road sections 64, 66 with the mobility platform 46.

The control center 50 transmits the information concerning the journey, from the start point 54 to the destination point 56, to the drone 20, where the information is stored in the control unit 30, and starts the drone 20. The first part of the journey is a flight section 59. It ends at the beginning of the first road section 64. There, the drone 20 lands on the drone carrier of a first service bus, and is transported by the latter to the end of the first road section 64. During transport, the mating coupling 38 is connected to the coupling 36, and via the central station 48 and the mobility platform 46 it is communicated to the control center 50, via the sensor 42, that the drone 20 is on the first service bus. If the coupling 36 of the drone 20 is also equipped with a sensor 42, the control center 50 also receives a corresponding signal directly via the drone 20. During the co-travel the battery 28 is also charged.

At the end of the first road section 64, the drone 20 lifts off from the travelling first line bus; this event is sensed by means of the at least one sensor 42 and communicated to the control center 50. The drone 20 then travels a second flight section 59, to the beginning of the second road section 66 of its accompanied journey on the second service bus, and lands there, on the drone carrier 40 booked for it. The further operations proceed as above. At the end of the second road section 66 a third flight section 59 begins, and the drone 20 flies directly to the destination point 56, where it delivers its article 34.

Terms such as substantially, preferably and the like, as well as particulars to be construed as being imprecise, are to be understood such that a deviation by plus/minus 5%, preferably plus/minus 2%, and in particular plus/minus one percent, from the normal value is possible. The applicant reserves the right to combine any features, and also subfeatures, from the claims, and/or any features, and also part-features, from a sentence of the description, in any manner, with other features, sub-features or part-features, including outside the features of independent claims.

In the different figures, parts that are equivalent in respect of their function are always denoted by the same reference, such that usually these parts are also described only once.

REFERENCES 20 drone
22 flight control unit 24 electric motor
26 rotor
28 battery
30 control unit
32 space
34 article
35 arrow
36 coupling
38 mating coupling
40 drone carrier
42 sensor
44 vehicle
46 mobility platform
48 central station
50 control center
52 limited area
54 start point
56 destination point
59 flight section
60 co-travel section
62 rest point
64 first road section
66 second road section

The invention claimed is:

1. A method for transporting an article from a start point to a destination point, the method comprising:
   inputting data of an article, wherein the data comprises the destination point, into a control center; and
   planning and organization of a journey of the article to the destination point by the control center, comprising the steps of:
   selecting a drone at the start point for the journey,
   planning an itinerary, with request to a mobility platform for a drone place for at least one road section, and booking the at least one road section, including planning at least one flight section,
   storing the at least partly complete itinerary, and transmitting data of the stored itinerary into a control unit of the drone, and
   sending a start command to start the drone, wherein, in the organizing of the journey, proportions of flight sections on the itinerary are weighted with a higher weighting factor than the proportions of road sections on the itinerary, and wherein, for the total distance of the journey, a sum of individual weighting factors times length of the individual sections is minimized.

2. The method as claimed in claim 1, wherein the control center continuously receives data concerning a current location of the drone and checks whether these data correspond with the planned itinerary and, if a deviation is ascertained in this case, the control center calculates a new itinerary.

3. The method as claimed in claim 1, wherein the control center receives information on whether the drone is or is not located on a drone carrier.

4. The method as claimed in claim 1, wherein, if it is ascertained during the journey of the drone that there is currently no suitable drone carrier in the vicinity of the drone, the control center requests a waiting place and, if the latter is free, causes the drone to park on the waiting place.

5. The method as claimed in claim 1, wherein the organizing of the journey is configured such that, for a journey, the total sum of the road section is greater than the total sum of the flight section.

6. The method as claimed in claim 1, wherein, in the case of a transport standstill over a road section, if a location coordinate of the drone does not change for a certain time span, the control center causes the drone to leave the drone carrier and to fly to another drone carrier or, if appropriate, to the destination point.

7. The method as claimed in claim 1, wherein the proportions of flight sections on the itinerary are weighted with at least twice as great a weighting factor than the proportions of road sections on the itinerary.

8. The method as claimed in claim 5, wherein the total sum of the road sections is at least twice as great than the total sum of the flight sections.

9. A method for transporting an article from a start point to a destination point, the method comprising:
   inputting data of an article, wherein the date comprises the destination point, into a control center; and
   planning and organization of a journey of the article to the destination point by the control center, comprising the steps of:
   selecting a drone at the destination point for the journey,
   planning an itinerary, with request to a mobility platform for a drone place for at least one road section, and booking the at least one road section, including planning at least one flight section,
   storing the at least partly complete itinerary, and transmitting data of the stored itinerary into a control unit of the drone, and
   sending a start command to start the drone, wherein, in the case of a transport standstill over a road section, if a location coordinate of the drone does not change for a certain time span, the control center causes the drone to leave the drone carrier and to fly to another drone carrier or, if appropriate, to the destination point.

* * * * *